US008849613B2

(12) United States Patent
Caillat (10) Patent No.: US 8,849,613 B2
(45) Date of Patent: Sep. 30, 2014

(54) VIBRATION PROTECTION IN A VARIABLE SPEED COMPRESSOR

(75) Inventor: Jean-Luc M. Caillat, Dayton, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 781 days.

(21) Appl. No.: 12/983,615

(22) Filed: Jan. 3, 2011

(65) Prior Publication Data

US 2011/0129354 A1 Jun. 2, 2011

Related U.S. Application Data

(63) Continuation of application No. 12/244,528, filed on Oct. 2, 2008, now Pat. No. 7,895,003.

(60) Provisional application No. 60/977,859, filed on Oct. 5, 2007.

(51) Int. Cl.
*G05B 9/00* (2006.01)
(Continued)

(52) U.S. Cl.
CPC ............ *F04B 39/0027* (2013.01); *G01H 17/00* (2013.01); *G06F 11/30* (2013.01);
(Continued)

(58) Field of Classification Search
CPC .......... F01B 25/00; F01B 25/16; F01C 20/00; F01C 20/28; F01D 19/00; F04B 39/00; F04B 39/0027; F04B 49/00; F04B 49/06; F04B 49/065; F04B 49/10; F04C 14/00; F04C 14/28; F04C 28/00; F04C 28/28; F04C 2270/00; F04C 2270/05; F04C 2270/051; F04C 2270/15; F04C 2270/155; F04C 2270/023; F04C 2270/70; G01D 7/00; G01D 9/00; G01D 21/00; G01H 17/00; G01M 15/00; G01M 15/02; G01M 99/00; G01M 99/004; G05B 9/00; G05B 9/02; G06F 11/00; G06F 11/30; G06F 11/34; G06F 17/00; G06F 17/40; G06F 19/00

USPC ............ 73/66, 168, 457, 460, 462, 570, 577, 73/579, 584, 865.8, 865.9; 318/445, 456, 318/460, 461, 490; 340/500, 540, 635, 648, 340/665, 669, 679, 683; 417/1, 14, 42, 417/44.1, 44.11, 212; 700/1, 90, 304, 306; 702/1, 33, 34, 56, 127, 182, 183, 184, 702/185, 187, 189; 708/100, 105, 200
See application file for complete search history.

(56) References Cited

U.S. PATENT DOCUMENTS 2,883,255 A 4/1959 Anderson
2,981,076 A 4/1961 Gaugler
(Continued)

FOREIGN PATENT DOCUMENTS

CN 1697954 A 11/2005
CN 1806478 A 7/2006
(Continued)

OTHER PUBLICATIONS

Written Opinion of the International Searching Authority regarding International Application No. PCT/US2008/011576 dated Mar. 23, 2009.
(Continued)

*Primary Examiner* — Edward Cosimano
(74) *Attorney, Agent, or Firm* — Harness, Dickey & Pierce, P.L.C.

(57) ABSTRACT

Vibration protection in a compressor system with a variable speed compressor may include operating a variable speed compressor of a compressor system at a first frequency, measuring a vibration of the compressor system at the first frequency, determining whether the vibration exceeds a maximum vibration value, and operating the variable speed compressor at an average frequency equivalent to the first frequency, when the vibration exceeds the maximum vibration value, by identifying an allowed upper frequency and an allowed lower frequency, calculating an upper operating time and a lower operating time, and operating the variable speed compressor at the allowed upper frequency for the upper operating time and the allowed lower frequency for the lower operating time.

20 Claims, 5 Drawing Sheets

(51) Int. Cl.

| | | |
|---|---|---|
| G01H 17/00 | (2006.01) | |
| F01B 25/00 | (2006.01) | |
| F01C 20/28 | (2006.01) | |
| F01D 19/00 | (2006.01) | |
| F04B 49/10 | (2006.01) | |
| F04C 14/28 | (2006.01) | |
| G01M 99/00 | (2011.01) | |
| G06F 11/30 | (2006.01) | |
| G06F 17/40 | (2006.01) | |
| G06F 19/00 | (2011.01) | |
| F04B 39/00 | (2006.01) | |
| F01B 25/16 | (2006.01) | |

(52) U.S. Cl.
CPC ............... *G01M 99/00* (2013.01); *G06F 19/00* (2013.01); *G05B 9/00* (2013.01); *G06F 17/40* (2013.01); *F04B 49/10* (2013.01); *F04C 14/28* (2013.01); *F01B 25/16* (2013.01); *F01C 20/28* (2013.01)
USPC ........... 702/182; 73/168; 73/865.8; 73/865.9; 318/460; 318/490; 417/44.11; 700/1; 700/56; 700/187; 700/189

(56) References Cited

U.S. PATENT DOCUMENTS

| | | | |
|---|---|---|---|
| 3,082,609 | A | 3/1963 | Ryan et al. |
| 3,242,321 | A | 3/1966 | Chope |
| 3,265,948 | A * | 8/1966 | Sones et al. ............... 318/799 |
| 3,600,657 | A | 8/1971 | Pfaff et al. |
| 4,130,997 | A | 12/1978 | Hara et al. |
| 4,280,910 | A | 7/1981 | Baumann |
| 4,370,564 | A | 1/1983 | Matsushita |
| 4,460,861 | A | 7/1984 | Rosa |
| 4,461,153 | A | 7/1984 | Lindner et al. |
| 4,527,399 | A | 7/1985 | Lord |
| 4,653,280 | A | 3/1987 | Hansen et al. |
| 4,750,338 | A | 6/1988 | Hingst |
| 4,940,929 | A | 7/1990 | Williams |
| 5,056,712 | A | 10/1991 | Enck |
| 5,182,918 | A | 2/1993 | Manz et al. |
| 5,203,178 | A | 4/1993 | Shyu |
| 5,258,901 | A | 11/1993 | Fraidlin |
| 5,269,146 | A | 12/1993 | Kerner |
| 5,291,115 | A | 3/1994 | Ehsani |
| 5,315,214 | A | 5/1994 | Lesea |
| 5,347,467 | A | 9/1994 | Staroselsky et al. |
| 5,359,276 | A | 10/1994 | Mammano |
| 5,359,281 | A | 10/1994 | Barrow et al. |
| 5,410,221 | A | 4/1995 | Mattas et al. |
| 5,410,235 | A | 4/1995 | Ehsani |
| 5,428,965 | A | 7/1995 | Grunwald et al. |
| 5,440,218 | A | 8/1995 | Oldenkamp |
| 5,502,970 | A | 4/1996 | Rajendran |
| 5,506,930 | A * | 4/1996 | Umida ............... 388/815 |
| 5,519,300 | A | 5/1996 | Leon et al. |
| 5,603,222 | A | 2/1997 | Dube |
| 5,603,227 | A | 2/1997 | Holden et al. |
| 5,646,499 | A | 7/1997 | Doyama et al. |
| 5,663,627 | A | 9/1997 | Ogawa |
| 5,712,551 | A | 1/1998 | Lee |
| 5,712,802 | A | 1/1998 | Kumar et al. |
| 5,742,103 | A | 4/1998 | Ashok |
| 5,786,992 | A | 7/1998 | Vinciarelli et al. |
| 5,903,138 | A | 5/1999 | Hwang et al. |
| 5,960,207 | A | 9/1999 | Brown |
| 5,963,442 | A | 10/1999 | Yoshida et al. |
| 6,005,365 | A | 12/1999 | Kaneko et al. |
| 6,028,406 | A | 2/2000 | Birk |
| 6,035,653 | A | 3/2000 | Itoh et al. |
| 6,041,609 | A | 3/2000 | Hornsleth et al. |
| 6,065,298 | A | 5/2000 | Fujimoto |
| 6,073,457 | A | 6/2000 | Kampf et al. |
| 6,091,215 | A | 7/2000 | Lovett et al. |
| 6,091,233 | A | 7/2000 | Hwang et al. |
| 6,102,665 | A | 8/2000 | Centers et al. |
| 6,116,040 | A | 9/2000 | Stark |
| 6,220,045 | B1 | 4/2001 | Kim |
| 6,222,746 | B1 | 4/2001 | Kim |
| 6,226,998 | B1 | 5/2001 | Reason et al. |
| 6,236,183 | B1 | 5/2001 | Schroeder |
| 6,236,193 | B1 | 5/2001 | Paul |
| 6,259,614 | B1 | 7/2001 | Ribarich et al. |
| 6,281,656 | B1 | 8/2001 | Masaki et al. |
| 6,281,658 | B1 | 8/2001 | Han et al. |
| 6,316,918 | B1 | 11/2001 | Underwood et al. |
| 6,326,750 | B1 | 12/2001 | Marcinkiewicz |
| 6,344,725 | B2 | 2/2002 | Kaitani et al. |
| 6,370,888 | B1 | 4/2002 | Grabon |
| 6,373,200 | B1 | 4/2002 | Nerone et al. |
| 6,396,229 | B1 | 5/2002 | Sakamoto et al. |
| 6,404,154 | B2 | 6/2002 | Marcinkiewicz et al. |
| 6,406,265 | B1 | 6/2002 | Hahn et al. |
| 6,414,462 | B2 | 7/2002 | Chong |
| 6,446,618 | B1 | 9/2002 | Hill |
| 6,462,492 | B1 | 10/2002 | Sakamoto et al. |
| 6,471,486 | B1 | 10/2002 | Centers et al. |
| 6,523,361 | B2 | 2/2003 | Higashiyama |
| 6,532,754 | B2 | 3/2003 | Haley et al. |
| 6,539,734 | B1 | 4/2003 | Weyna |
| 6,583,593 | B2 | 6/2003 | Iijima et al. |
| 6,636,011 | B2 | 10/2003 | Sadasivam et al. |
| 6,670,784 | B2 | 12/2003 | Odachi et al. |
| 6,688,124 | B1 | 2/2004 | Stark et al. |
| 6,698,217 | B2 | 3/2004 | Tanimoto et al. |
| 6,708,507 | B1 | 3/2004 | Sem et al. |
| 6,714,425 | B2 | 3/2004 | Yamada et al. |
| 6,735,284 | B2 | 5/2004 | Cheong et al. |
| 6,749,404 | B2 | 6/2004 | Gennami et al. |
| 6,753,670 | B2 | 6/2004 | Kadah |
| 6,756,753 | B1 | 6/2004 | Marcinkiewicz |
| 6,756,757 | B2 | 6/2004 | Marcinkiewicz et al. |
| 6,758,050 | B2 | 7/2004 | Jayanth et al. |
| 6,767,851 | B1 | 7/2004 | Rokman et al. |
| 6,788,024 | B2 | 9/2004 | Kaneko et al. |
| 6,815,925 | B2 | 11/2004 | Chen et al. |
| 6,825,637 | B2 | 11/2004 | Kinpara et al. |
| 6,828,751 | B2 | 12/2004 | Sadasivam et al. |
| 6,831,439 | B2 | 12/2004 | Won et al. |
| 6,876,171 | B2 | 4/2005 | Lee |
| 6,915,646 | B2 | 7/2005 | Kadle et al. |
| 6,955,039 | B2 | 10/2005 | Nomura et al. |
| 6,966,759 | B2 | 11/2005 | Hahn et al. |
| 6,967,851 | B2 | 11/2005 | Yang et al. |
| 6,982,533 | B2 | 1/2006 | Seibel et al. |
| 6,984,948 | B2 | 1/2006 | Nakata et al. |
| 7,005,829 | B2 | 2/2006 | Schnetzka |
| 7,049,774 | B2 | 5/2006 | Chin et al. |
| 7,095,208 | B2 | 8/2006 | Kawaji et al. |
| 7,138,777 | B2 | 11/2006 | Won et al. |
| 7,154,237 | B2 | 12/2006 | Welchko et al. |
| 7,176,644 | B2 | 2/2007 | Ueda et al. |
| 7,184,902 | B2 | 2/2007 | El-Ibiary |
| 7,208,895 | B2 | 4/2007 | Marcinkiewicz et al. |
| 7,234,305 | B2 | 6/2007 | Nomura et al. |
| 7,272,018 | B2 | 9/2007 | Yamada et al. |
| 7,307,401 | B2 | 12/2007 | Gataric et al. |
| 7,342,379 | B2 | 3/2008 | Marcinkiewicz et al. |
| 7,375,485 | B2 | 5/2008 | Shahi et al. |
| 7,458,223 | B2 | 12/2008 | Pham |
| 7,554,271 | B2 | 6/2009 | Thiery et al. |
| 7,580,272 | B2 | 8/2009 | Taguchi et al. |
| 7,595,613 | B2 | 9/2009 | Thompson et al. |
| 7,605,570 | B2 | 10/2009 | Liu et al. |
| 7,613,018 | B2 | 11/2009 | Lim et al. |
| 7,660,139 | B2 | 2/2010 | Garabandic |
| 7,667,986 | B2 | 2/2010 | Artusi et al. |
| 7,675,759 | B2 | 3/2010 | Artusi et al. |
| 7,683,568 | B2 | 3/2010 | Pande et al. |
| 7,688,608 | B2 | 3/2010 | Oettinger et al. |
| 7,706,143 | B2 | 4/2010 | Lang et al. |
| 7,723,964 | B2 | 5/2010 | Taguchi |

(56) References Cited

U.S. PATENT DOCUMENTS

| | | |
|---|---|---|
| 7,733,678 B1 | 6/2010 | Notohamiprodjo et al. |
| 7,738,228 B2 | 6/2010 | Taylor |
| 7,782,033 B2 | 8/2010 | Turchi et al. |
| 7,821,237 B2 | 10/2010 | Melanson |
| 7,895,003 B2 | 2/2011 | Caillat |
| 2001/0022939 A1 | 9/2001 | Morita et al. |
| 2002/0047635 A1 | 4/2002 | Ribarich et al. |
| 2002/0062656 A1 | 5/2002 | Suitou et al. |
| 2002/0108384 A1 | 8/2002 | Higashiyama |
| 2002/0117989 A1 | 8/2002 | Kawabata et al. |
| 2002/0157408 A1 | 10/2002 | Egawa et al. |
| 2002/0162339 A1 | 11/2002 | Harrison et al. |
| 2003/0019221 A1 | 1/2003 | Rossi et al. |
| 2003/0077179 A1 | 4/2003 | Collins et al. |
| 2003/0085621 A1 | 5/2003 | Potega |
| 2003/0094004 A1 | 5/2003 | Pham et al. |
| 2003/0146290 A1 | 8/2003 | Wang et al. |
| 2003/0182956 A1 | 10/2003 | Kurita et al. |
| 2004/0011020 A1 | 1/2004 | Nomura et al. |
| 2004/0061472 A1 | 4/2004 | Won et al. |
| 2004/0070364 A1 | 4/2004 | Cheong et al. |
| 2004/0085785 A1 | 5/2004 | Taimela |
| 2004/0100221 A1 | 5/2004 | Fu |
| 2004/0119434 A1 | 6/2004 | Dadd |
| 2004/0183491 A1 | 9/2004 | Sidey |
| 2004/0221594 A1 | 11/2004 | Suzuki et al. |
| 2004/0261448 A1 | 12/2004 | Nishijima et al. |
| 2005/0047179 A1 | 3/2005 | Lesea |
| 2005/0204760 A1 | 9/2005 | Kurita et al. |
| 2005/0235660 A1 | 10/2005 | Pham |
| 2005/0235661 A1 | 10/2005 | Pham |
| 2005/0235662 A1 | 10/2005 | Pham |
| 2005/0235663 A1 | 10/2005 | Pham |
| 2005/0247073 A1 | 11/2005 | Hikawa et al. |
| 2005/0262849 A1 | 12/2005 | Nomura et al. |
| 2005/0270814 A1 | 12/2005 | Oh |
| 2006/0041335 A9 | 2/2006 | Rossi et al. |
| 2006/0042276 A1 | 3/2006 | Doll et al. |
| 2006/0048530 A1 | 3/2006 | Jun et al. |
| 2006/0056210 A1 | 3/2006 | Yamada et al. |
| 2006/0090490 A1 | 5/2006 | Grimm et al. |
| 2006/0117773 A1 | 6/2006 | Street et al. |
| 2006/0123809 A1 | 6/2006 | Ha et al. |
| 2006/0130501 A1 | 6/2006 | Singh et al. |
| 2006/0150651 A1 | 7/2006 | Goto et al. |
| 2006/0158912 A1 | 7/2006 | Wu et al. |
| 2006/0185373 A1 | 8/2006 | Butler et al. |
| 2006/0187693 A1 | 8/2006 | Tang |
| 2006/0198172 A1 | 9/2006 | Wood |
| 2006/0198744 A1 | 9/2006 | Lifson et al. |
| 2006/0247895 A1 | 11/2006 | Jayanth |
| 2006/0255772 A1 | 11/2006 | Chen |
| 2006/0261830 A1 | 11/2006 | Taylor |
| 2006/0290302 A1 | 12/2006 | Marcinkiewicz et al. |
| 2007/0012052 A1 | 1/2007 | Butler et al. |
| 2007/0029987 A1 | 2/2007 | Li |
| 2007/0040524 A1 | 2/2007 | Sarlioglu et al. |
| 2007/0040534 A1 | 2/2007 | Ghosh et al. |
| 2007/0089424 A1 | 4/2007 | Venkataramani et al. |
| 2007/0118307 A1 | 5/2007 | El-Ibiary |
| 2007/0118308 A1 | 5/2007 | El-Ibiary |
| 2007/0132437 A1 | 6/2007 | Scollo et al. |
| 2007/0144354 A1 | 6/2007 | Muller et al. |
| 2008/0089792 A1 | 4/2008 | Bae et al. |
| 2008/0112823 A1 | 5/2008 | Yoshida et al. |
| 2008/0143289 A1 | 6/2008 | Marcinkiewicz et al. |
| 2008/0160840 A1 | 7/2008 | Bax et al. |
| 2008/0209925 A1 | 9/2008 | Pham |
| 2008/0216494 A1 | 9/2008 | Pham et al. |
| 2008/0232065 A1 | 9/2008 | Lang et al. |
| 2008/0252269 A1 | 10/2008 | Feldtkeller et al. |
| 2008/0265847 A1 | 10/2008 | Woo et al. |
| 2008/0272745 A1 | 11/2008 | Melanson |
| 2008/0272747 A1 | 11/2008 | Melanson |
| 2008/0273356 A1 | 11/2008 | Melanson |
| 2008/0284399 A1 | 11/2008 | Oettinger et al. |
| 2008/0285318 A1 | 11/2008 | Tan et al. |
| 2009/0015214 A1 | 1/2009 | Chen |
| 2009/0015225 A1 | 1/2009 | Turchi et al. |
| 2009/0016087 A1 | 1/2009 | Shimizu |
| 2009/0033296 A1 | 2/2009 | Hammerstrom |
| 2009/0039852 A1 | 2/2009 | Fishelov et al. |
| 2009/0059625 A1 | 3/2009 | Viitanen et al. |
| 2009/0071175 A1 | 3/2009 | Pham |
| 2009/0091961 A1 | 4/2009 | Hsia et al. |
| 2009/0093911 A1* | 4/2009 | Caillat ............... 700/280 |
| 2009/0094997 A1 | 4/2009 | McSweeney |
| 2009/0140680 A1 | 6/2009 | Park |
| 2009/0237963 A1 | 9/2009 | Prasad et al. |
| 2009/0243561 A1 | 10/2009 | Tan et al. |
| 2009/0273330 A1 | 11/2009 | Sisson |
| 2009/0290395 A1 | 11/2009 | Osaka |
| 2009/0295347 A1 | 12/2009 | Popescu et al. |
| 2009/0303765 A1 | 12/2009 | Shimizu et al. |
| 2009/0316454 A1 | 12/2009 | Colbeck et al. |
| 2010/0007317 A1 | 1/2010 | Yang |
| 2010/0014326 A1 | 1/2010 | Gu et al. |
| 2010/0014329 A1 | 1/2010 | Zhang et al. |
| 2010/0052601 A1 | 3/2010 | Pummer |
| 2010/0052641 A1 | 3/2010 | Popescu et al. |
| 2010/0079125 A1 | 4/2010 | Melanson et al. |
| 2010/0080026 A1 | 4/2010 | Zhang |
| 2010/0109615 A1 | 5/2010 | Hwang et al. |
| 2010/0109626 A1 | 5/2010 | Chen |
| 2010/0118571 A1 | 5/2010 | Saint-Pierre |
| 2010/0118576 A1 | 5/2010 | Osaka |
| 2010/0128503 A1 | 5/2010 | Liu et al. |
| 2010/0156377 A1 | 6/2010 | Siegler |
| 2010/0165683 A1 | 7/2010 | Sugawara |
| 2010/0181930 A1 | 7/2010 | Hopwood et al. |
| 2010/0187914 A1 | 7/2010 | Rada et al. |
| 2010/0202169 A1 | 8/2010 | Gaboury et al. |
| 2010/0226149 A1 | 9/2010 | Masumoto |
| 2010/0246220 A1 | 9/2010 | Irving et al. |
| 2010/0246226 A1 | 9/2010 | Ku et al. |
| 2010/0253307 A1 | 10/2010 | Chen et al. |
| 2010/0259230 A1 | 10/2010 | Boothroyd |
| 2010/0270984 A1 | 10/2010 | Park et al. |
| 2011/0138826 A1 | 6/2011 | Lifson et al. |
| 2012/0279251 A1 | 11/2012 | Kido et al. |

FOREIGN PATENT DOCUMENTS

| | | |
|---|---|---|
| CN | 1987258 A | 6/2007 |
| EP | 1209362 A2 | 5/2002 |
| JP | 55155134 A | 12/1980 |
| JP | 61272483 A | 12/1986 |
| JP | 01167556 | 7/1989 |
| JP | 2-4163 A | 1/1990 |
| JP | 03129255 A | 6/1991 |
| JP | 04344073 A | 11/1992 |
| JP | H05322224 A | 12/1993 |
| JP | 06159738 | 6/1994 |
| JP | 07035393 A | 2/1995 |
| JP | 09196524 A | 7/1997 |
| JP | 10009683 | 1/1998 |
| JP | 10-97331 | 4/1998 |
| JP | 10153353 A | 6/1998 |
| JP | 10160271 | 6/1998 |
| JP | H10-153353 | 6/1998 |
| JP | H1123075 | 1/1999 |
| JP | 11159895 A | 6/1999 |
| JP | 11287497 A | 10/1999 |
| JP | 2000002496 A | 1/2000 |
| JP | 2000205630 A | 7/2000 |
| JP | 2000297970 A | 10/2000 |
| JP | 2001026214 A | 1/2001 |
| JP | 2001317470 A | 11/2001 |
| JP | 2002013858 A | 1/2002 |
| JP | 2002243246 A | 8/2002 |
| JP | 2003074945 A | 3/2003 |
| JP | 2003156244 | 5/2003 |
| JP | 2004135491 A | 4/2004 |
| JP | 2005-003710 A | 1/2005 |

(56) References Cited

FOREIGN PATENT DOCUMENTS

| | | |
|---|---|---|
| JP | 2005132167 A | 5/2005 |
| JP | 2005282972 A | 10/2005 |
| JP | 2006177214 A | 7/2006 |
| JP | 2006188954 | 7/2006 |
| JP | 2006233820 | 9/2006 |
| JP | 2007198230 A | 8/2007 |
| JP | 2007198705 A | 8/2007 |
| JP | 2009264699 A | 11/2009 |
| JP | 2010266132 A | 11/2010 |
| JP | 2011033340 A | 2/2011 |
| KR | 10-1996-0024115 | 7/1996 |
| KR | 10-2001-0044273 A | 6/2001 |
| KR | 10-2003-0011415 A | 2/2003 |
| KR | 10-2005-0059842 A | 6/2005 |
| KR | 20050085544 A | 8/2005 |
| KR | 10-2007-0071407 A | 7/2007 |
| WO | WO-9702729 A1 | 1/1997 |
| WO | 2004059822 A1 | 7/2004 |
| WO | 2004083744 A1 | 9/2004 |
| WO | WO-2005101939 A1 | 10/2005 |
| WO | WO 2009/045495 A1 * | 4/2009 |
| WO | WO-2009048566 A3 | 5/2009 |
| WO | WO-2011083756 A1 | 7/2011 |

OTHER PUBLICATIONS

International Search Report regarding International Application No. PCT/US2008/011464 dated Mar. 13, 2009.
Written Opinion of the International Searching Authority regarding International Application No. PCT/US2008/011464 dated Mar. 13, 2009.
International Search Report for International Application No. PCT/US2008/011442 dated Feb. 3, 2009.
International Search Report for International Applicatoin No. PCT/US2008/011596, dated Feb. 25, 2009.
International Search Report for International Application No. PCT/US2008/011441, dated Jan. 30, 2009.
International Search Report for International Application No. PCT/US2008/011570, dated May 26, 2009.
Written Opinion of the International Searching Authority for International Application No. PCT/US2008/011570, dated May 26, 2009.
Written Opinion of the International Searching Authority for International Application No. PCT/US2008/011593, dated Jun. 17, 2009.
International Search Report for International Application No. PCT/US2008/011593, dated Jun. 17, 2009.
Written Opinion of the International Searching Authority for International Application No. PCT/US2008/011597, dated Jun. 19, 2009.
International Search Report for International Application No. PCT/US2008/011597, dated Jun. 19, 2009.
International Search Report for International Application No. PCT/US2008/011590, dated Feb. 27, 2009.
International Search Report for International Application No. PCT/US2008/011589, dated Feb. 27, 2009.
Written Opinion of the International Searching Authority for International Application No. PCT/US2008/011442, dated Feb. 3, 2009.
Written Opinion of the International Searching Authority for International Application No. PCT/US2008/011596, dated Feb. 25, 2009.
Written Opinion of the International Searching Authority for International Application No. PCT/US2008/011441, dated Jan. 30, 2009.
Written Opinion of the International Searching Authority for International Application No. PCT/US2008/011589, dated Feb. 27, 2009.
Written Opinion of the International Searching Authority for International Application No. PCT/US2008/011590, dated Feb. 27, 2009.
Notice of Allowance and Fee(s) Due and Notice of Allowability regarding U.S. Appl. No. 12/244,528, dated Sep. 7, 2010.
Supplemental Notice of Allowability regarding U.S. Appl. No. 12/244,528, dated Dec. 17, 2010.
Non-Final Office Action regarding U.S. Appl. No. 12/246,825, dated Jan. 4, 2011.
Non-Final Office Action regarding U.S. Appl. No. 12/247,033, dated Jan. 21, 2011.
Notification of the Second Office Action from the State Intellectual Property Office of People's Republic of China regarding Chinese Patent Application No. 200880110665.0, dated Apr. 5, 2012.
Notification of Grounds for Refusal regarding Korean Patent Application No. 10-2010-7006707, dated May 22, 2012. Translation provided by Y.S. Chang & Associates.
Non-Final Office Action regarding U.S. Appl. No. 12/246,927, dated Jun. 6, 2012.
Final Office Action regarding U.S. Appl. No. 12/247,020, dated Jun. 6, 2012.
Non-Final Office Action regarding U.S. Appl. No. 12/246,959, dated Jun. 13, 2012.
Non-Final Office Action regarding U.S. Appl. No. 12/247,001, dated Feb. 25, 2011.
Non-Final Office Action regarding U.S. Appl. No. 12/244,387, dated Mar. 3, 2011.
Notification of the First Office Action from the State Intelletual Property Office of People's Republic of China regarding Chinese Application No. 200880110551.6, dated Feb. 11, 2011.
Non-Final Office Action regarding U.S. Appl. No. 12/246,893, dated Apr. 1, 2011.
Notification of First Office Action from the State Intellectual Property Office of People's Republic of China regarding Chinese Patent Application No. 200880110665.0, dated Apr. 8, 2011.
Notice of Grounds for Rejection from the Korean Intellectual Property Office regarding Korean Patent Application No. 10-2010-7009374, dated May 31, 2011.
Final Office Action regarding U.S. Appl. No. 12/246,825, dated Jun. 14, 2011.
Office Action regarding U.S. Appl. No. 12/246,959, dated Jun. 21, 2011.
Final Office Action regarding U.S. Appl. No. 12/247,033, dated Jul. 12, 2011.
Appeal Brief regarding U.S. Appl. No. 12/247,001, dated Feb. 1, 2012.
Examiner's Answer to Appellant's Appeal Brief regarding U.S. Appl. No. 12/247,001, dated Mar. 26, 2012.
Final Office Action regarding U.S. Appl. No. 12/244,387, dated Aug. 17, 2011.
Final Office Action regarding U.S. Appl. No. 12/244,416, dated Nov. 15, 2011.
Final Office Action regarding U.S. Appl. No. 12/246,959, dated Oct. 12, 2011.
Final Office Action regarding U.S. Appl. No. 12/247,001, dated Sep. 1, 2011.
Non-Final Office Action regarding U.S. Appl. No. 12/247,033, dated Jan. 19, 2012.
Notice of Appeal from the Examiner to the Board of Patent Appeals and Interferences and Pre-Appeal Brief Request for Review regarding U.S. Appl. No. 12/247,001, dated Dec. 1, 2011.
Notice of Final Rejection from the Korean Intellectual Property Office regarding Korean Application No. 10-2010-7009374, dated Nov. 18, 2011.
Notice of Panel Decision from Pre-Appeal Brief Review regarding U.S. Appl. No. 12/247,001, dated Dec. 27, 2011.
Notification of First Office action from the State Intellectual Property Office of People's Republic of China regarding Chinese Patent Application No. 200880110484.8, dated Dec. 23, 2011.
Notification of First Office Action from the State Intellectual Property Office of People's Republic of China regarding Chinese Patent Application No. 200880110590.6, dated Feb. 29, 2012.
Notification of Grounds for Refusal regarding Korean Patent Application No. 10-2010-7007375, dated Dec. 7, 2011.
Notification of Grounds for Refusal regarding Korean Patent Application No. 10-2010-7007583, dated Nov. 14, 2011.
Notification of Grounds for Refusal regarding Korean Patent Application No. 10-2010-7007583 from the Korean Intellectual Property Office, dated Dec. 28, 2011.
Notification of Grounds for Refusal regarding Korean Patent Application No. 10-2010-7009659, dated Feb. 8, 2012.
Notification of the First Office Action from the State Intellectual Property Office of People's Republic of China regarding Chinese Patent Application No. 200880111091.9 dated Nov. 23, 2011.

(56) References Cited

OTHER PUBLICATIONS

Office Action regarding U.S. Appl. No. 12/246,825, dated Oct. 12, 2011.
Office Action regarding U.S. Appl. No. 12/244,387, dated Mar. 1, 2012.
Office Action regarding U.S. Appl. No. 12/244,416, dated Aug. 8, 2011.
Office Action regarding U.S. Appl. No. 12/246,893, dated Dec. 7, 2011.
Office Action regarding U.S. Appl. No. 12/246,893, dated Aug. 1, 2011.
Office Action regarding U.S. Appl. No. 12/246,927, dated Sep. 6, 2011.
Office Action regarding U.S. Appl. No. 12/247,020, dated Sep. 1, 2011.
Final Office Action regarding U.S. Appl. No. 12/247,033, dated Jul. 5, 2012.
Notification of the First Office Action from the State Intellectual Property Office of People's Republic of China regarding Chinese Application No. 200880110726, dated Jun. 5, 2012.
Notification of First Office Action from the State Intellectual Property Office of People's Republic of China regarding Chinese Patent Application No. 200880110616.7, dated Jul. 4, 2012.
"Solving System of Equations by Substitution," by cstl.syr.edu/fipse/algebra/unit5/subst.htm, dated Aug. 30, 2012; 4 pages.
"Electrical Power vs Mechanical Power," by Suvo, brighthubengineering.com/machine-design/62310-electrical-power-vs-mechanical-power/; dated Jan. 25, 2010; 2 pages.
Applicant-Initiated Interview Summary regarding U.S. Appl. No. 12/246,927, dated Sep. 5, 2012.
Applicant-Initiated Interview Summary regarding U.S. Appl. No. 12/247,020, dated Sep. 6, 2012.
Final Office Action regarding U.S. Appl. No. 12/244,387, dated Aug. 13, 2012.
Notification of Grounds for Refusal regarding Korean Patent Application No. 10-2010-7006707, dated Oct. 23, 2012.
Notice of Allowance and Fees Due regarding U.S. Appl. No. 12/247,020, dated Jan. 4, 2013.
Notice of Allowance and Fees Due regarding U.S. Appl. No. 12/246,927, dated Dec. 21, 2012.
Final Office Action regarding U.S. Appl. No. 12/246,959, dated Dec. 4, 2012.
Second Office Action from the State Intellectual Property Office of People's Republic of China regarding Chinese Patent Application No. 200880110785.0, dated Dec. 28, 2012.
Non-Final Office Action regarding U.S. Appl. No. 12/247,033, dated Jan. 29, 2013.
Notice of Allowance and Fee(s) Due regarding U.S. Appl. No. 12/246,959, dated Feb. 14, 2013.
Third Chinese Office Action from the State Intellectual Property Office of People's Republic of China regarding Chinese Patent Application No. 200880111091.9, dated Feb. 18, 2013.
Second Office Action from the State Intellectual Property Office of People's Republic of China regarding Chinese Patent Application No. 2008801110726, dated Mar. 15, 2013.
Notification of Final Rejection from Korean Intellectual Property Office regarding Korean Patent Application No. 10-2010-7006707, dated Apr. 2, 2013.
Second Office Action from the State Intellectual Property Office of People's Republic of China regarding Chinese Patent Application No. 200880110616.7, dated Apr. 1, 2013.
European Search Report regarding Application No. 13161753.2-1602, dated Jul. 12, 2013.
Third Office Action from the State Intellectual Property Office of People's Republic of China regarding Chinese Patent Application No. 200880110616.7, dated Jul. 22, 2013.
Third Office Action from the State Intellectual Property Office of People's Republic of China regarding Chinese Patent Application No. 200880110726, dated Sep. 12, 2013.
Fourth Office Action from the State Intellectual Property Office of People's Republic of China regarding Chinese Patent Application No. 200880110785.0, dated Oct. 21, 2013.
Office Action regarding U.S. Appl. No. 14/031,905, dated Dec. 13, 2013.
Decision of Rejection from the State Intellectual Property Office for People's Republic of China regarding Chinese Patent Application No. 200880110616.7, dated Nov. 27, 2013.
European Search Report regarding Application No. 08836902.0-1602/2198159 PCT/US2008011464, dated Apr. 4, 2014.

* cited by examiner

VIBRATION PROTECTION IN A VARIABLE SPEED COMPRESSOR

CROSS-REFERENCE TO RELATED APPLICATIONS

This application is a continuation of U.S. patent application Ser. No. 12/244,528 filed on Oct. 2, 2008, now U.S. Pat. No. 7,895,003. This application claims the benefit of U.S. Provisional Application No. 60/977,859, filed on Oct. 5, 2007, now expired. The entire disclosures of each of the above applications are incorporated herein by reference.

FIELD

The present disclosure relates to compressors, and more particularly, to vibration protection of a compressor system with a variable speed compressor.

BACKGROUND

The statements in this section merely provide background information related to the present disclosure and may not constitute prior art.

Compressors are used in a wide variety of industrial and residential applications to circulate refrigerant within a refrigeration, heat pump, HVAC, or chiller system (generally referred to as "refrigeration systems") to provide a desired heating and/or cooling effect. In any of the foregoing applications, the compressor should provide consistent and efficient operation to ensure that the particular refrigeration system functions properly.

A refrigeration system may include a series of components such as a compressor, condenser, evaporator, valves, piping and electrical components. A compressor system of the refrigeration system may include the compressor and related components that may be packaged as a unit. The compressor may be driven by a motor and the compressor system may experience vibrations. The compressor and compressor system may have one or more resonant (or natural) frequencies which may be excited at corresponding motor speeds (i.e., frequency) and result in relatively high amplitude vibrations of the compressor and compressor system.

For a fixed-speed compressor, a suspension system such as grommets or other such devices may be added to the compressor system such that the operating speed of the compressor does not correspond to a resonant frequency of the system. In other words, the compressor system may be designed such that its resonant frequency is at an acceptable value in relation to the compressor's operating frequency. A variable-speed compressor may operate at frequencies above, below and including the operating frequency of a typical fixed-speed compressor. Thus, a suspension system as was described with respect to the fixed-speed compressor may not be suitable for a variable-speed compressor as it would normally operate at some resonant frequency without any other preventative solutions.

SUMMARY

A method of vibration protection in a compressor system with a variable speed compressor including operating a variable speed compressor at a plurality of frequencies, measuring a plurality of vibration values associated with the plurality of frequencies, determining a frequency characteristic of the compressor system based on the plurality of vibration values, and identifying prohibited frequencies of the compressor based on the frequency characteristic.

The frequency characteristic may include a resonant frequency.

The prohibited compressor frequencies may include a range of the resonant frequency plus or minus a critical frequency difference.

The critical frequency difference may be at least 1 Hz.

The frequency characteristic may include a frequency range wherein the vibration values exceed a maximum acceleration amplitude.

The maximum acceleration amplitude may $(A)=4\pi^2\times$(frequency)$^2\times$(maximum allowable displacement).

The maximum allowable displacement amplitude may be at least $25\times10^{-6}$ meters.

The prohibited compressor frequencies may include the frequency range wherein the vibration values exceed the maximum acceleration amplitude.

The operating step may include operating a variable speed compressor at a minimum sweep frequency, increasing the frequency of the variable speed compressor by a frequency increment, and continuing the increasing until the frequency of the variable speed compressor is at least a maximum sweep frequency.

The measuring step may include measuring a vibration value associated with each frequency increment.

The vibration value may be at least one of an acceleration of the system, a velocity of the system and an amplitude of the vibration.

The identifying step may include storing a prohibited frequency value for each frequency wherein the vibration value exceeds a maximum allowable vibration.

The measuring step may include receiving a plurality of vibration values from an accelerometer and storing the vibration values in memory.

The method may further include operating the variable speed compressor at a first frequency ($F_1$) outside of the prohibited frequencies for a first time ($T_1$) and operating the variable speed compressor at a second frequency ($F_2$) outside of the prohibited frequencies for a second time ($T_2$), wherein the time-averaged frequency is equal to a requested frequency ($T_R$) within the prohibited frequencies.

The first frequency may be a closest allowable upper frequency, the second frequency is a closest allowable lower frequency, and the first time $T_1$ is equal to a predetermined total time$\times(F_R-F_2)/(F_1-F_2)$ and the second time $T_2$=predetermined total time$-T_1$.

The method may further include requesting operation at a first frequency, determining a first allowed frequency furthest from the first frequency, operating at said first allowed frequency for a predetermined time, determining a second allowed frequency in a direction opposite to a direction of the first allowed frequency, and operating at said second allowed frequency for a period of time substantially equal to said predetermined time.

The method may further include repeating the operating, measuring, determining and identifying when the compressor restarts.

The method may further include repeating the operating, measuring, determining and identifying steps at a predetermined interval.

The predetermined interval may be once a week.

The method may further include repeating the operating, measuring, determining and identifying steps when a heat pump system changes an operating mode between heating and cooling.

The method may further include repeating the operating, measuring, determining and identifying steps when a measured vibration value exceeds a predetermined sweep threshold.

The predetermined sweep threshold may be 110% of a maximum acceleration amplitude $A=4\pi^2\times(\text{frequency})^2\times(\text{maximum allowable displacement})$.

The method may further include repeating the operating, measuring, determining and identifying when the ambient temperature change over a predetermined time exceeds a predetermined temperature threshold.

The predetermined time may be at least 24 hours and the predetermined temperature threshold is at least 40 degrees Fahrenheit.

A method of vibration protection in a compressor system having a variable speed compressor includes operating a variable speed compressor at a first frequency, measuring a vibration of the compressor system at the first frequency, determining whether the vibration exceeds a maximum vibration value, and operating the variable speed compressor at an average frequency equivalent to the first frequency when the vibration exceeds the maximum vibration value. Operating the variable speed compressor at an average frequency vibration value may include identifying an allowed upper frequency and an allowed lower frequency, calculating an upper operating time and a lower operating time, and operating the variable speed compressor at the allowed upper frequency for the upper operating time and the allowed lower frequency for the lower operating time.

The maximum vibration value may be defined by $A=4\pi^2\times(\text{frequency})^2\times(\text{maximum allowable displacement})$.

The maximum allowable displacement may be at least $25\times10^{-6}$ meters.

The allowed upper frequency may be a closest frequency above the first frequency wherein a measured acceleration is less than a maximum acceleration value for the allowed upper frequency.

The allowed lower frequency may be a closest frequency below the first frequency wherein a measured acceleration is less than a maximum acceleration value for the allowed lower frequency.

The step of calculating the upper operating time and the lower operating time may include calculating an upper ratio of the difference between the first frequency and the allowed lower frequency divided by the difference between the allowed upper frequency and the allowed lower frequency, calculating the upper operating time by multiplying a predetermined operating time by the upper ratio, and calculating the lower operating time by subtracting the upper operating time from the predetermined operating time.

The predetermined operating time may be at least four minutes.

A variable speed compressor and drive system may include a compressor including a motor having a variable frequency based on a motor input, a drive in communication with the motor providing the motor input based on a drive input, a vibration measurement device operably coupled to the compressor to receive vibration from a compressor system and output vibration values based on the received vibration, and a control module in communication with the vibration measurement device and the drive, wherein the control module receives and stores the vibration values, determines frequency characteristics of the compressor based on the vibration values, and provides the drive input based on the frequency characteristics.

The vibration measurement device may be mounted to the shell of the compressor.

The vibration measurement device may be mounted to the drive.

The system may further include a terminal box attached to the compressor.

The vibration measurement device may be mounted to the terminal box.

The frequency characteristics may include a resonant frequency.

The control module may include an input to the drive that prohibits the drive from operating the motor at frequencies including the resonant frequency plus or minus a critical frequency difference.

The critical frequency difference may be at least 1 Hz.

The frequency characteristics may include a frequency range wherein the vibration values exceed a predetermined threshold.

The control module may include an input to the drive that prohibits the drive from operating the motor at frequencies including the frequency range wherein the vibration values exceed the predetermined threshold.

The control module may provide a signal to the drive to operate the motor at a minimum frequency, provide a signal to the drive to increase the motor frequency by a frequency interval, and receive and store vibration values from the accelerometer for each frequency interval, continue the increasing until the frequency of the variable speed compressor is at least a maximum compressor frequency, and calculate a prohibited frequency range based on the vibration values.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated or group) and memory that execute one or more software or firmware programs, a combinational logic circuit, or other suitable components that provide the described functionality.

Figure 1:
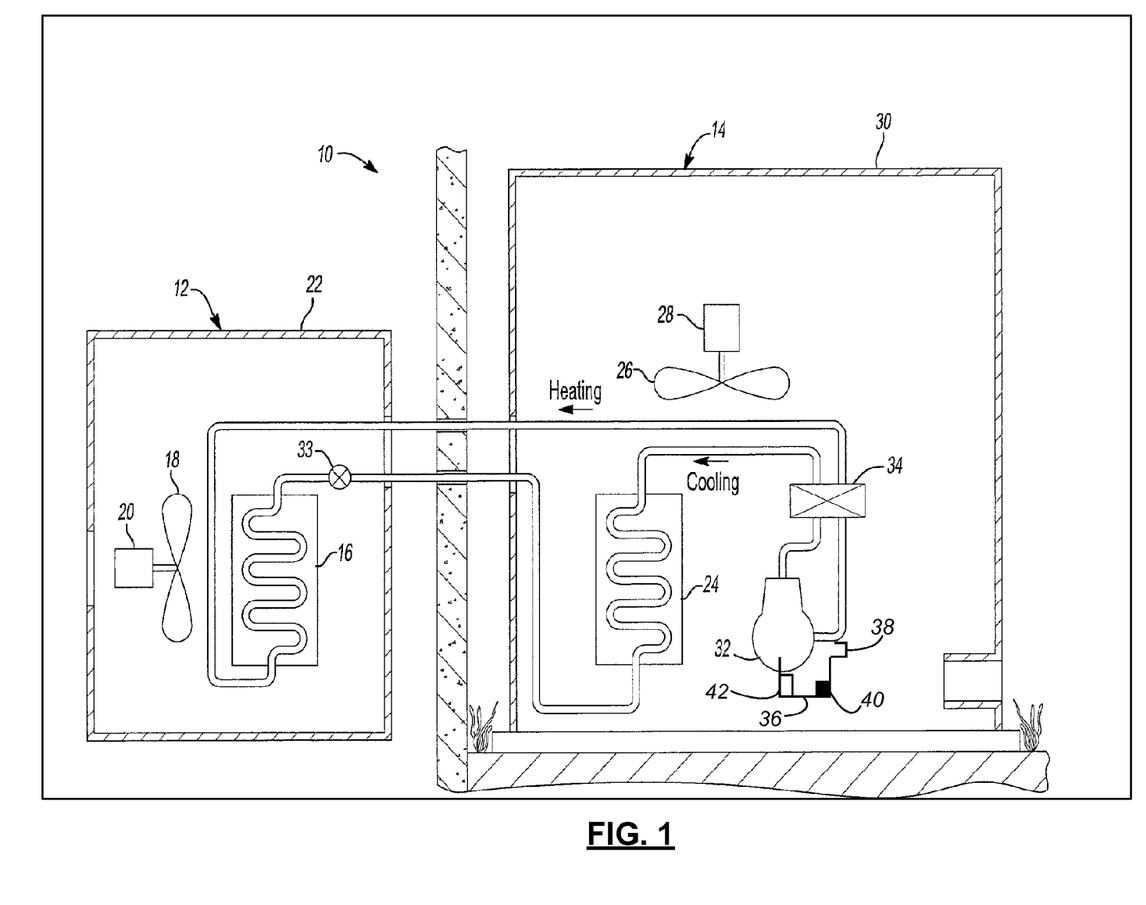
FIG. 1 is a schematic illustration of a heat pump system.

As seen in FIG. 1, a heat pump system 10 may include an indoor unit 12 and a compressor system 14. A heat pump system is used for illustration purposes only, and it should be understood that the present teachings apply to any application in which a compressor may be utilized. For example, a compressor may alternatively be used in an air conditioning system, a refrigeration system, or generally in any system in which a refrigerant is compressed to provide a desired heating or cooling effect. Although compressor system 14 has been depicted as including the components described below, compressor system 14 may be any group of components that is packaged as a unit with compressor 32.

Indoor unit 12 may include an indoor coil or heat exchanger 16 and a variable speed indoor fan 18 driven by a motor 20. Indoor coil 16 and fan 18 may be enclosed in a cabinet 22 so that fan 18 forces ambient air across indoor coil 16. Compressor system 14 may include an outdoor coil or heat exchanger 24 and a variable speed outdoor fan 26 driven by a motor 28. Outdoor coil 24 and fan 26 may be enclosed in a protective housing 30 so that fan 26 will draw ambient outdoor air across outdoor coil 24 to improve heat transfer.

Compressor system 14 may further include a compressor 32 in communication with indoor coil 16 and outdoor coil 24. Compressor 32 may include inverter drive 36 and terminal box 38. Inverter drive 36 may be fixedly attached to a shell of compressor 32 and may provide a variable input power to a motor of compressor 32, allowing compressor 32 to operate at a variable speed (i.e., frequency). Terminal box 38 may be fixedly attached to a shell of compressor 32 and may provide an input point for electrical, communication and other inputs to compressor 32.

Accelerometer 40 and control module 42 are depicted as mounted to inverter drive 36. Accelerometer 40 may measure acceleration and may alternatively be mounted to a shell of compressor 32, terminal box 38, or other locations within heat pump system 10. Control module 42 may be integral to inverter drive 32. Control module 42 may receive a signal from accelerometer 40 and control the output of inverter drive 36.

Communication between compressor 32, indoor coil 16, and outdoor coil 24 may generally form a loop, wherein compressor 32, indoor coil 16, and outdoor coil 24 are arranged in series with one another with an expansion device 33 located between indoor coil 16 and outdoor coil 24. The heat pump system 10 may include a reversing valve 34 disposed between compressor 32 and indoor and outdoor coils 16, 24, such that the direction of flow between compressor 32, indoor coil 16, and outdoor coil 24 may be reversed between first and second directions.

In the first direction, heat pump system 10 operates in a cooling mode providing a flow in a direction indicated by the "cooling" arrow. In the cooling mode, compressor 32 provides a fluid to outdoor coil 24. The fluid then travels to indoor coil 16 and then back to compressor 32. In the cooling mode, indoor coil 16 functions as an evaporator coil and outdoor coil 24 functions as a condenser coil.

In the second direction, heat pump system 10 operates in a heating mode providing a flow in a direction indicated by the "heating" arrow. In the heating mode, flow is reversed, traveling from compressor 32 to indoor coil 16 to outdoor coil 24, and then back to compressor 32. In the heating mode, indoor coil 16 functions as a condenser coil and outdoor coil 24 functions as an evaporator coil.

Figure 2:
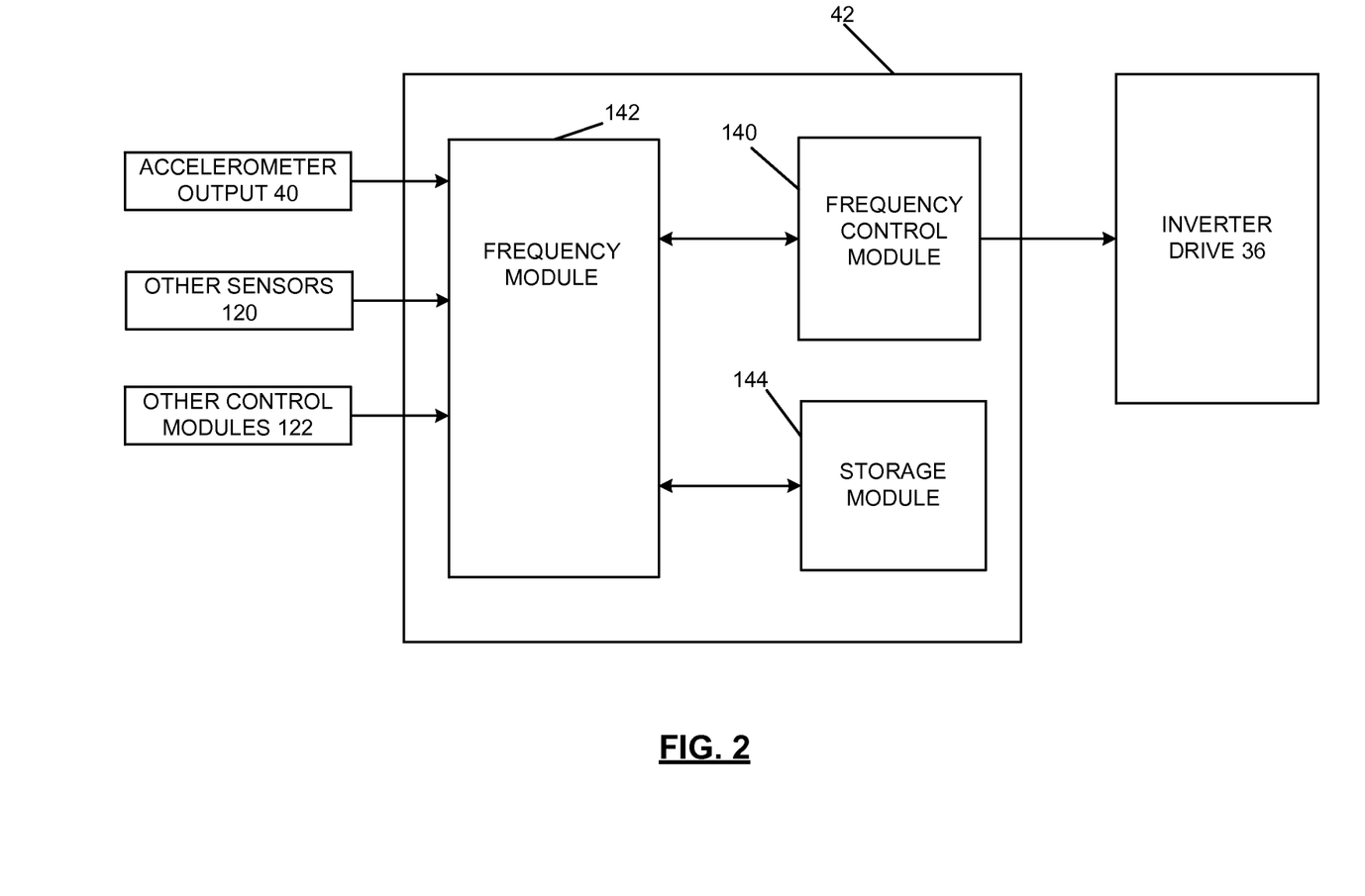
FIG. 2 is a schematic view of a control system for vibration protection.

Referring now to FIG. 2, control module 42 may include frequency control module 140, frequency module 142, and storage module 144. Frequency module 142 may be in communication with an output from accelerometer 40 as well as other sensors 120 from heat pump system 10 and other control modules 122 from heat pump system 10 such as a compressor controller or system controller. Frequency module 142 may be in communication with storage module 144 and frequency control module 140.

Storage module 144 may receive measured or determined values from frequency module 142 and may store those values. Storage module 144 may also contain predetermined values and thresholds. Frequency control module 140 may be in communication with frequency module 142 and may control inverter drive 36 to operate a motor of compressor 32 at a chosen frequency. Although control module 42 is depicted as separate from inverter drive 36, it should be recognized that control module 42 may be integral to inverter drive 36.

Compressor 32 may be driven by a motor (not shown) and compressor system 14 may experience vibrations. Vibrations experienced by compressor system 14 may be defined in different manners including, but not limited to, an amplitude of the vibration, a maximum velocity of the system 14, or as a maximum acceleration of the system 14.

Figure 3:
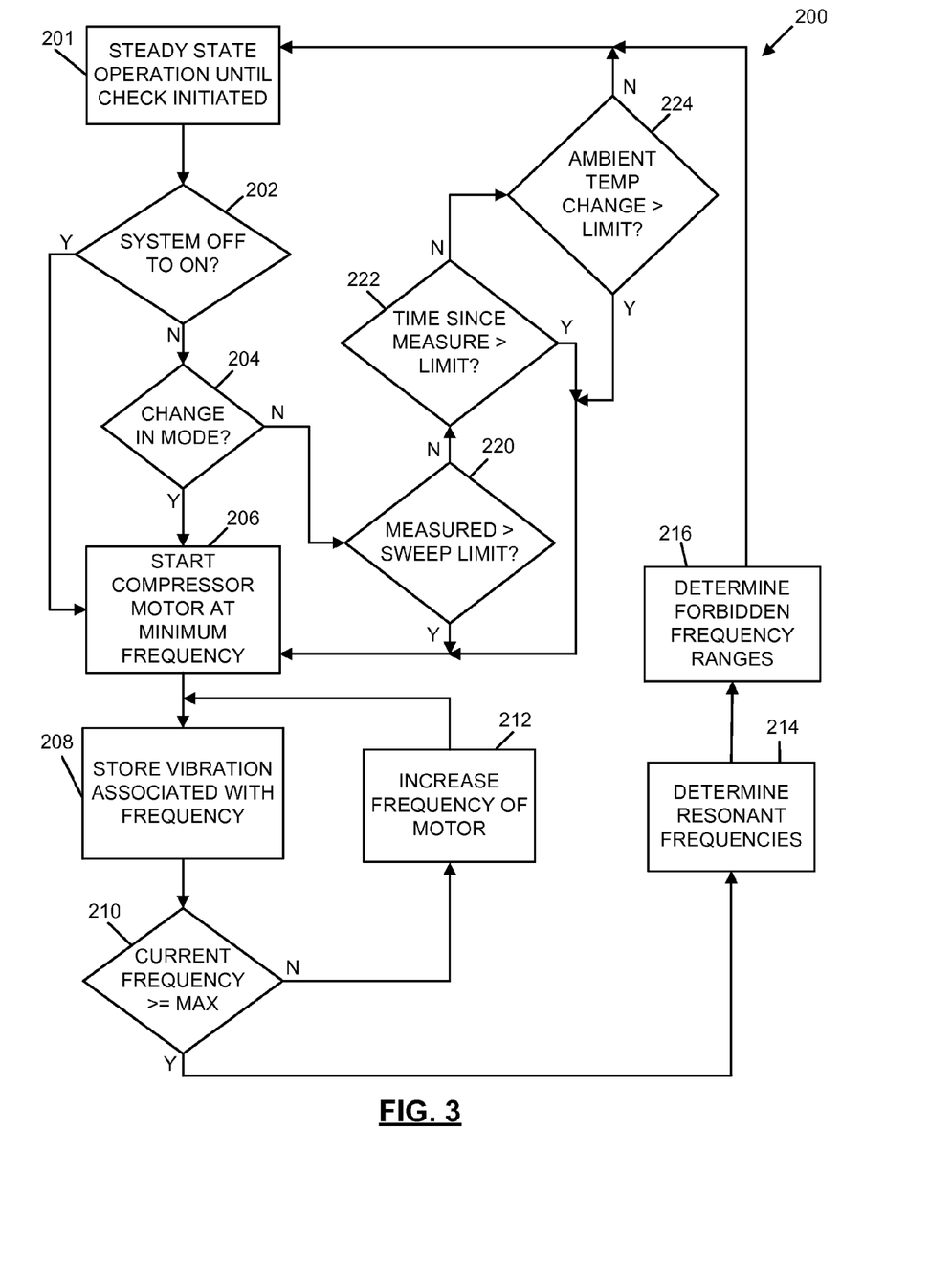
FIG. 3 is a flow diagram of steps of a control system for vibration protection.

Referring now to FIG. 3, steps in determining vibration characteristics of a compressor from accelerometer and frequency information are depicted. Control logic 200 depicts a continuous loop, but for purposes of the present disclosure description of control logic 200 will begin at block 201. At block 201, the compressor 32 of compressor system 14 may operate at steady state until a sweep check is initiated. As will be described in more detail in FIG. 4 below, steady state operation may include control module 42 operating compressor 32 to avoid prohibited frequency ranges while a frequency sweep is not being performed. A sweep check may be initiated in response to a flag from an input, at a regular time interval, at an electronic clock interval, or as a regular portion of a programmed subroutine. When the sweep check is initiated, control logic 200 may continue to block 202.

In the first series of steps (i.e., steps 202, 204, 220, 222, 224), frequency module 142 may determine whether it is necessary to run a frequency sweep to determine vibration characteristics of the compressor. At step 202, frequency module 142 may determine whether the compressor system 14 has transitioned from OFF to ON. The ability to determine the compressor system 14 OFF or ON state may be internal to frequency module 142 or may be determined from communications with other sensors 120 or other control modules 122. If the compressor system 14 state has changed from OFF to ON, control logic 200 may continue to block 206. If the compressor system 14 state has not changed from OFF to ON, control logic 200 may continue to block 204.

At block 204, frequency module 142 may determine whether a change in the operating mode of heat pump system 10 has occurred. This may occur when heat pump system 10 switches from heating to cooling mode or vice versa. Frequency module 142 may communicate with other control modules 122 or other sensors 120 to determine whether the mode has changed. If there has been a change in mode, control logic 200 may continue to step 206. If there has not been a change in mode, control logic 200 may continue to step 220.

At block 220, frequency module 142 may determine whether an input from accelerometer 40 exceeds a sweep limit. Y may be a maximum amplitude of motion that may not be exceeded at any rotational frequency of the compressor, where the frequency is represented by the variable F in hertz (Hz). An example Y value may be $25 \times 10^{-6}$ meters. A maximum acceleration A may be related to F and Y by the following equation in which the maximum acceptable acceleration amplitude A is equal to $A = 4\pi^2 \times F^2 \times Y$. At block 220, frequency module 142 may compare accelerometer output 40 to a maximum amplitude A for the current operating frequency of the motor of compressor 32. If the measured accelerometer output 40 is 110 percent of the maximum amplitude A for a particular frequency, control logic 200 may continue to block

206. When operation at a previously allowed operating frequency exhibits vibration at 110 percent of A, it is a good indication that the operation of the compressor system 14 has changed in some manner. If the measured accelerometer output 40 is less than 110 percent of the limit A, control logic may continue to step 222.

At block 222, frequency module 142 may determine the time since the last frequency sweep was performed. In many situations, a heat pump system 10 may operate for an extended period without shutting down or without other conditions that may initiate a frequency sweep. Accordingly, frequency module 142 may determine the time since the last frequency sweep and may access a predetermined time value such as one week from storage module 144. If the elapsed time since the last frequency sweep exceeds the predetermined time, control logic 200 may continue to block 206. If the elapsed time since the last frequency sweep does not exceed the predetermined limit, control logic 200 may continue to block 224.

At block 224, frequency module 142 may receive an ambient temperature. A temperature sensor may be integral to control module 142 or a temperature value may be read from other sensors 120. Alternatively, frequency module 142 may communicate with other control modules 122 of heat pump system 10 which may measure an ambient temperature value. Frequency module 142 may access storage module 144 to acquire previously stored temperature values and a predetermined temperature change limit. For example, previous temperature values may be stored for 24 hours and a predetermined temperature change limit may be at least 40 degrees Fahrenheit. Frequency module 142 may compare the measured temperature with stored temperature values from the previous 24 hours and if the difference between any set of temperature readings exceeds the predetermined temperature change limit, control logic 200 may continue to block 206. If the temperature difference does not exceed 40 degrees Fahrenheit, control logic 200 may return to block 201 to continue steady state operation.

At block 206, the frequency sweep routine may begin. Frequency module 142 may receive a minimum sweep frequency and a maximum sweep frequency from storage module 144. Frequency module 142 may communicate with frequency control module 140 to operate inverter drive 36 to operate a motor of compressor 32 at the minimum sweep frequency. Control logic 200 may continue to block 208. At block 208, frequency module 142 may receive an accelerometer output 40 associated with the commanded frequency. Frequency module 142 may store the accelerometer and frequency values at storage module 144. Control logic 200 may continue to block 210.

At block 210, frequency module 142 may determine whether the present operating frequency is at least the maximum sweep frequency. If the present operating frequency is not at least the maximum sweep frequency, control logic 200 may continue to block 212. At block 212, frequency module 142 may increment the current frequency of operation of the motor to a higher value to continue the frequency sweep. Frequency control module 140 may control inverter drive 36 such that the motor of compressor 32 operates at the incremented frequency. In this manner, blocks 208, 210, and 212 may loop until the frequency sweep is complete and store the frequency values and associated accelerometer 40 acceleration readings. Once the operating frequency reaches the maximum sweep frequency, control logic 200 may continue to block 214.

At block 214, frequency module 142 may determine the resonant frequencies from the stored acceleration and frequency values in storage module 144. A resonant frequency may be found in any given frequency range when a local maximum of displacement, or velocity, or acceleration amplitude occurs. In other words, within each frequency range at which the measured acceleration exceeds maximum acceleration amplitude $A=4\pi^2 \times F^2 \times Y$, a resonant or natural frequency is found where a local maximum acceleration amplitude occurs within that range. A resonant or natural frequency may also be found within a given frequency range where a local maximum displacement or velocity amplitude occurs within the given range. Frequency module 142 may store the resonant frequencies in storage module 144.

At block 216, frequency module 142 may determine a prohibited frequency range such that frequency control module 140 will not operate inverter drive 36 to operate the motor of compressor 32 at any frequency within the prohibited frequency range in steady-state mode. The prohibited frequency range may be a range defined by the resonant frequency plus or minus a critical frequency difference (CFD), which for a typical compressor may be at least 1 hertz (Hz). This CFD may be approximately 1.5 percent of the particular resonant frequency encountered based on the following relationship. A frequency ratio may be represented by the equation $R=f_o/f_n$, where $f_o$ is the operating frequency and $f_n$ is the natural frequency. Undesirable vibrations may occur when the $f_o$ value is within 1.5 percent of $f_n$ as represented by the following equation of $|R-1|<\Delta_R$, where $\Delta_R$ is equal to 0.015. From these equations it can also be recognized that the critical frequency difference (in Hz) may increase at higher natural frequencies.

Alternatively, the prohibited frequency range can be the actual ranges where the measured acceleration exceeds the maximum A. Frequency module 142 may store the prohibited frequency ranges in storage module 144. It should be noted that the steps described in blocks 214 and 216 may also be performed as part of the loop of blocks 208, 210 and 212, wherein blocks 214 and 216 may calculate the resonant frequencies and forbidden frequency ranges during the frequency sweep. Control logic 200 may return to block 201 to operate at steady state.

Figure 4:
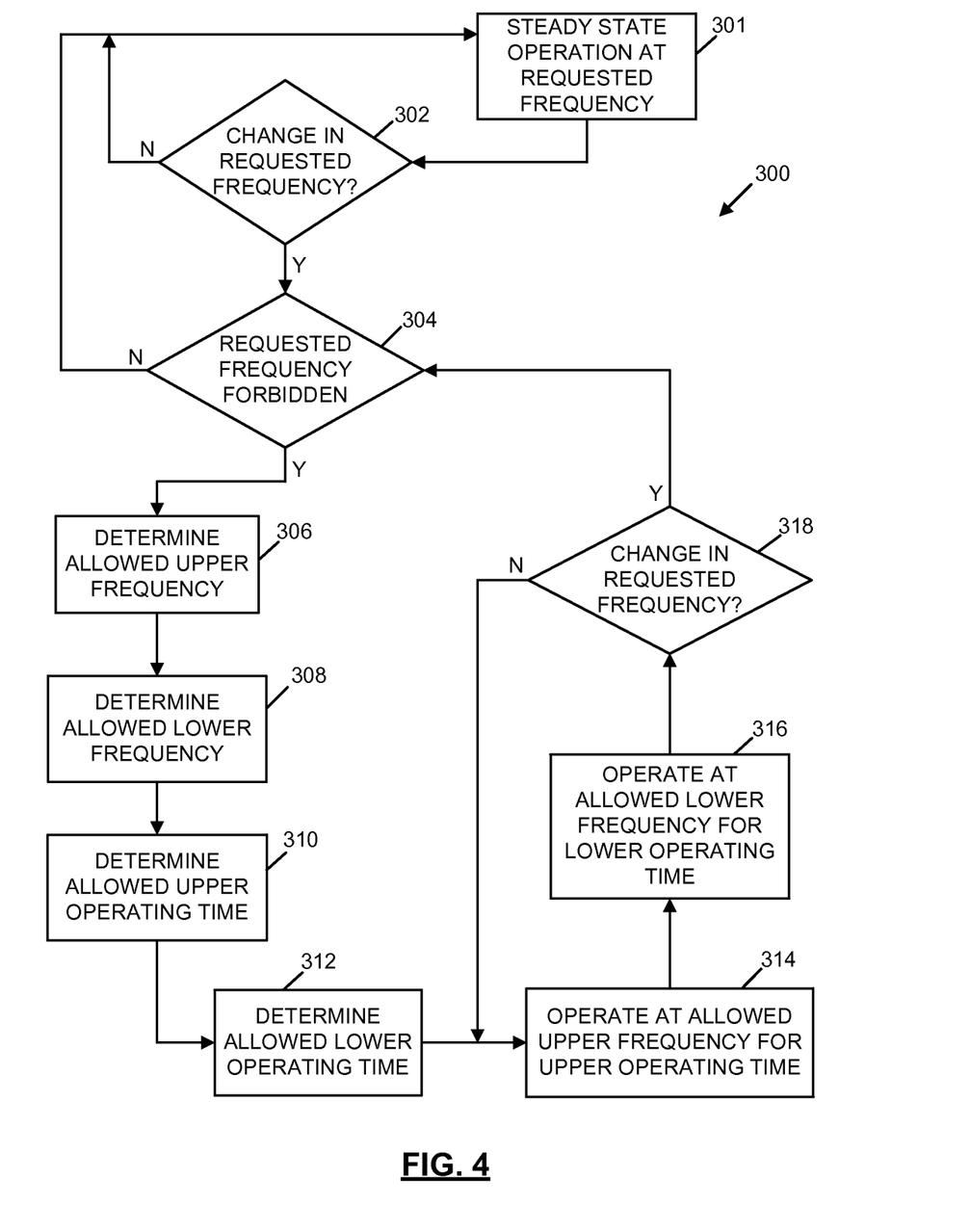
FIG. 4 is a flow diagram of steps of a control system for vibration protection.

Referring now to FIG. 4, control logic for operating a motor of compressor 32 at a requested frequency is depicted. A requested frequency may be based on an input from a user such as to change the heating or cooling effect of the heat pump system 10 or may be based on an output of other control modules 122 of heat pump system 10 such as a thermostat. Although control logic 300 depicts a continuous loop, control logic 300 is a subloop of overall steady state operation demonstrating a response to a changed requested frequency. Description of control logic 300 will begin at block 301.

At block 301, frequency module 142, upon receiving a command from other controllers 122, may command frequency control module 140 to operate inverter drive 36 to operate a motor of compressor 32 at a previously requested frequency. Otherwise, steady state operation may continue until the requested frequency changes. When the requested frequency changes, as is determined by frequency module 142 at block 302, control logic 300 may continue to block 304.

At block 304, frequency module 142 may compare the requested frequency to the prohibited frequency values stored in storage module 144. If the requested frequency value is not within the prohibited frequency ranges, control logic 300 may return to steady state operation at block 301. If the requested frequency value is within the prohibited frequency ranges, control logic 300 may continue to block 306.

At block 306, frequency module 142 may receive an allowed upper frequency from storage module 144. This allowed upper frequency may be a first frequency above the requested frequency but outside of the prohibited frequency range. The allowed upper frequency may also include a safety factor above this first frequency. Once the allowed upper frequency is determined, control logic 300 may continue to block 308.

At block 308, frequency module 142 may receive an allowed lower frequency from storage module 144. This allowed lower frequency may be a first frequency below the requested frequency but outside of the prohibited frequency range. The allowed lower frequency may also include a safety factor below this first frequency. Once the allowed lower frequency is determined, control logic 300 may continue to block 310.

At block 310, frequency module 142 may access a predetermined time value from storage module 144. The predetermined time value may correspond to a total time during which the frequency averaging routine described below may be run. For example, the total time may be four minutes. Frequency module 142 may then determine an upper frequency operating ratio based on the following: upper ratio=(requested frequency−lower frequency)÷(upper frequency−lower frequency). The upper frequency operating time may be equivalent to the predetermined time multiplied by the upper ratio. Once the upper frequency operating time is determined, control logic 300 may continue to block 312.

At block 312, frequency module 142 may use the predetermined time and calculated upper frequency operating time to determine the lower frequency operating time. The lower frequency operating time may simply be equal to the predetermined time minus the upper frequency operating time. It is also possible to calculate the lower frequency operating time first using a lower ratio=(upper frequency−requested frequency)÷(upper frequency−lower frequency). The lower frequency operating time and upper frequency operating time could then be calculated from the lower ratio. Once the allowed lower frequency operating time is determined, control logic 300 may continue to block 314.

At block 314, frequency module 142 may command frequency control module 140 to operate inverter drive 36 and the motor of compressor 32 at the allowed upper frequency and continue to operate at that frequency for the upper frequency operating time. Once the upper frequency operating time has elapsed, control logic 300 may continue to block 316. At block 316, frequency module 142 may command frequency control module 140 to operate inverter drive 36 and the motor of compressor 32 at the allowed lower frequency for the lower frequency operating time. Once the lower frequency operating time is complete, the time-averaged frequency output of the compressor over the total predetermined time may be equal to the requested frequency. Control logic 300 may then continue to block 318.

At block 318, frequency module 142 may determine whether there has been change in the requested frequency. If there has not been a change in the requested frequency, control logic 300 may return to block 314 and continue to loop through operating at the allowed upper frequency and allowed lower frequency such that the average frequency is equivalent to the requested frequency. If there has been a change in the requested frequency, control logic 300 may continue to block 304 to determine whether the requested frequency is prohibited.

Although the operation at an average frequency equivalent to a requested frequency within the prohibited frequency range has been described in a certain manner above, it should be recognized that such operation may also be done in other manners. For example, frequency module 142 may determine the allowed frequency furthest from the requested frequency. The motor of compressor 32 may be operated by inverter drive 36 and frequency control module 140 at this frequency for a predetermined time. Frequency module 142 may then determine a second operating frequency in the opposite (greater than or less than) direction from the first operating frequency. The second operating frequency may be at a same frequency difference from the requested frequency as the first operating frequency. The motor of compressor 32 may then be operated by inverter drive 36 and frequency module 140 at the second frequency for the same predetermined time as the first operating frequency because the differences between the requested frequency and the two operating frequencies are the same.

Figure 5:
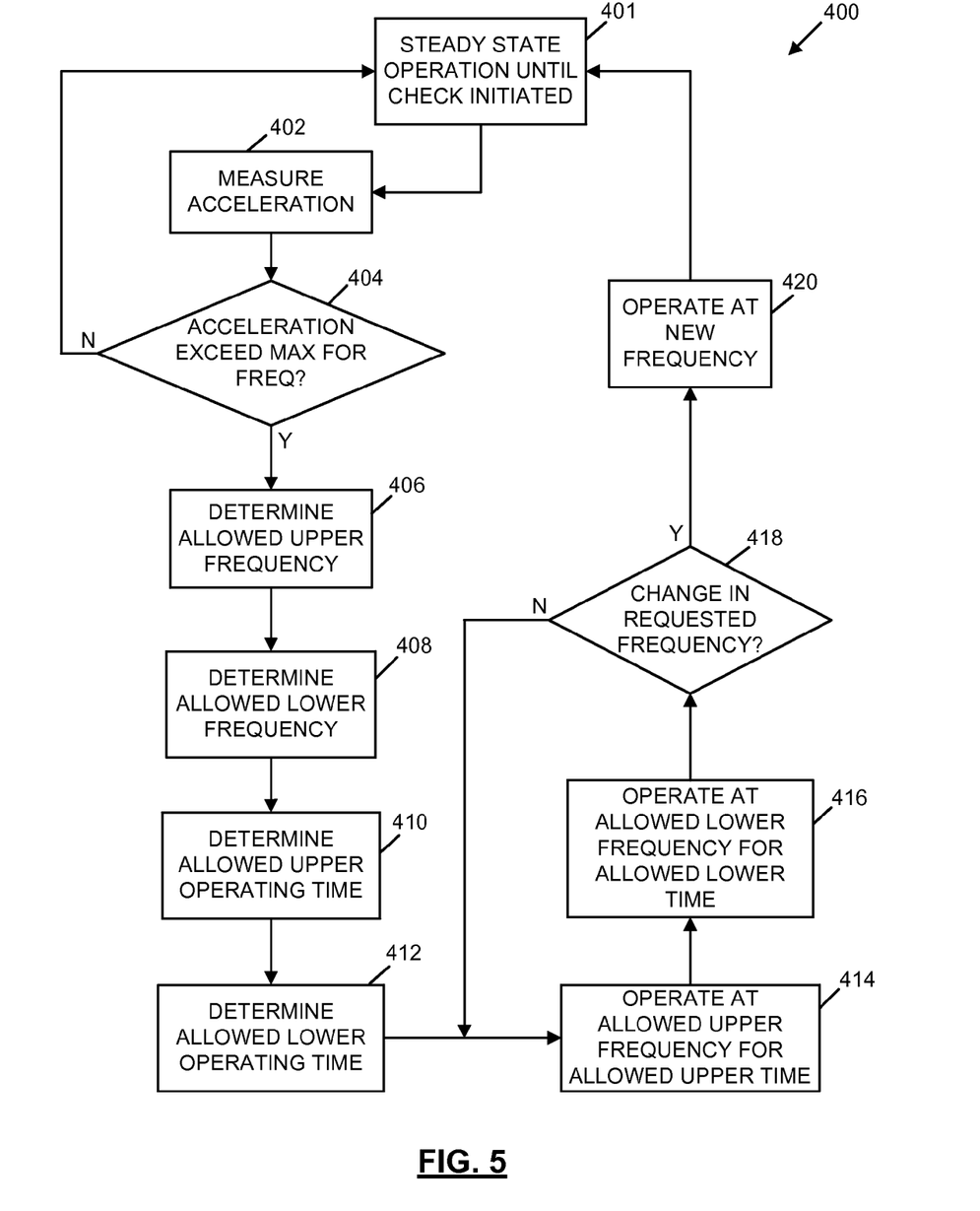
FIG. 5 is a flow diagram of steps of a control system for vibration protection.

Referring now to FIG. 5, alternative steps for variable speed compressor vibration protection are depicted. The steps described in FIG. 3 and FIG. 4 show performing a frequency sweep based on certain conditions, storing prohibited frequency ranges, and avoiding these frequency ranges during normal operation. The steps described in FIG. 5 simply measure the acceleration and avoid frequencies where the measured acceleration exceeds the limit $A=4\pi^2 \times F^2 \times Y$.

Although control logic 400 depicts operation in a continuous loop, the description of control logic 400 may begin with block 401. At block 401, frequency module 142 may command frequency control module 140 to operate inverter drive 36 to operate the motor of compressor 32 at a requested frequency. Operation may continue in this manner until a check of an acceleration value from accelerometer 40 is initiated. A check may be initiated in a number of ways, such as with each change in requested frequency, at a predetermined time interval, or whenever an acceleration value is received. Control logic 400 may continue to block 402.

At block 402, frequency module 142 may receive an acceleration reading from accelerometer 40. Control logic 400 may continue to block 404. At block 404, frequency module 142 may then determine whether the acceleration reading from the accelerometer exceeds a limit A for the particular frequency F based on the equation $A=4\pi^2 \times F^2 \times Y$. If the acceleration does not exceed the limit A, control logic 400 may return to block 401. If the acceleration does exceed the limit A, control logic 400 may continue to block 406.

At block 406, frequency module 142 may command frequency control module 140 to operate inverter drive 36 such that a motor of compressor 32 operates at a higher frequency. Frequency module 142 may receive measurements from accelerometer 40 and may continue to command frequency control module 140 to increase the frequency of inverter drive 36 and the motor of compressor 32 until an acceleration reading from accelerometer 40 is less than $A=4\pi^2 \times F^2 \times Y$ for the given frequency. This first frequency at which the measured acceleration does not exceed the acceleration limit may be the allowed upper frequency. The allowed upper frequency may also be this first measured frequency plus a safety factor. Once the allowed upper frequency is determined, control logic 400 may continue to block 408.

At block 408, frequency module 142 may command frequency control module 140 to operate inverter drive 36 such that a motor of compressor 32 operates at a frequency less than the requested frequency. Frequency module 142 may receive measurements from accelerometer 40 and may continue to command frequency control module 140 to decrease the frequency of inverter drive 36 and the motor of compressor 32 until an acceleration reading from accelerometer 40 is less than $A=4\pi^2 \times F^2 \times Y$ for the given frequency. This first frequency at which the measured acceleration does not exceed the acceleration limit may be the allowed lower frequency. The allowed lower frequency may also be this first measured frequency minus a safety factor. Once the allowed lower frequency is determined control logic 400 may continue to block 410.

At block 410, frequency module 142 may access a predetermined time value from storage module 144. The predetermined time value may correspond to a total time during which the frequency averaging routine described below may be run. For example, the total time may be four minutes. Frequency module 142 may then determine an upper frequency operating ratio based on the following: upper ratio=(requested frequency−lower frequency)÷(upper frequency−lower frequency). The upper frequency operating time may be equivalent to the predetermined time multiplied by the upper ratio. Once the upper frequency operating time is determined, control logic 400 may continue to block 412.

At block 412, frequency module 142 may use the predetermined time and calculated upper operating time to determine the lower frequency operating time. The lower frequency operating time may simply be equal to the predetermined time minus the upper frequency operating time. It is also possible to calculate the lower frequency operating time first using a lower ratio=(upper frequency−requested frequency)÷(upper frequency−lower frequency). The lower frequency operating time and upper frequency operating time could then be calculated from the lower ratio. Once the lower frequency operating time is determined, control logic 400 may continue to block 414.

At block 414, frequency module 142 may command frequency control module 140 to operate inverter drive 36 and the motor of compressor 32 at the allowed upper frequency and continue to operate at that frequency for the upper frequency operating time. Once the upper frequency operating time has elapsed, control logic 400 may continue to block 416. At block 416, frequency module 142 may command frequency control module 140 to operate inverter drive 36 and the motor of compressor 32 at the allowed lower frequency for the lower frequency operating time. Once the lower frequency operating time is complete, control logic 400 may continue to block 418.

At block 418, frequency module 142 may determine whether there has been change in the requested frequency. If there has not been a change in the requested frequency, control logic 400 may return to block 414 and continue to loop through operating at the allowed upper frequency and allowed lower frequency such that the average frequency is equivalent to the requested frequency. If a change in the requested frequency has occurred, control logic 400 may continue to block 420. At block 420, frequency module 142 may command frequency control module 140 to operate inverter drive 36 and the motor of compressor 32 at the new requested frequency. Control logic 400 may continue to block 401 to operate at steady state until the next check of the accelerometer.

Those skilled in the art may now appreciate from the foregoing that the broad teachings of the present disclosure may be implemented in a variety of forms. Therefore, while this disclosure has been described in connection with particular examples thereof, the true scope of the disclosure should no be so limited since other modifications will become apparent to the skilled practitioner upon a study of the drawings, the specification and the following claims.

What is claimed is:

1. A method comprising:
operating a variable speed compressor of a compressor system at a first frequency;
measuring a vibration of the compressor system at the first frequency;
determining whether the vibration exceeds a maximum vibration value; and
operating the variable speed compressor at an average frequency equivalent to the first frequency when the vibration exceeds the maximum vibration value, by:
identifying an allowed upper frequency and an allowed lower frequency;
calculating an upper operating time and a lower operating time; and
operating the variable speed compressor at the allowed upper frequency for the upper operating time and the allowed lower frequency for the lower operating time.

2. The method of claim 1, wherein the allowed upper frequency is a closest frequency above the first frequency such that the vibration is less than the maximum vibration value for the allowed upper frequency.

3. The method of claim 1, wherein the allowed lower frequency is a closest frequency below the first frequency such that the vibration is less than the maximum vibration value for the allowed lower frequency.

4. The method of claim 1, wherein the calculating the upper operating time and the lower operating time includes:
calculating an upper ratio of the difference between the first frequency and the allowed lower frequency divided by the difference between the allowed upper frequency and the allowed lower frequency;
calculating the upper operating time by multiplying a predetermined operating time by the upper ratio;
calculating the lower operating time by subtracting the upper operating time from the predetermined operating time.

5. The method of claim 4, wherein the predetermined operating time is at least four minutes.

6. The method of claim 1, wherein the maximum vibration value is: $4\pi^2 \times$(the first frequency)$^2 \times$(a maximum allowable displacement).

7. The method of claim 6, wherein the allowed lower frequency is a closest frequency below the first frequency such that a measured acceleration is less than a maximum acceleration value for the allowed lower frequency.

8. The method of claim 6, wherein the maximum allowable displacement is at least $25 \times 10^{-6}$ meters.

9. The method of claim 8, wherein the allowed upper frequency is a closest frequency above the first frequency such that a measured acceleration is less than a maximum acceleration value for the allowed upper frequency.

10. A system comprising:
a compressor including a motor operable at a variable frequency based on a motor input;
a drive in communication with the motor providing the motor input based on a drive input;
a vibration measurement device, operably coupled to the compressor, that measures a vibration of a compressor system that includes the compressor and that outputs vibration values based on the measured vibration; and
a control module in communication with the vibration measurement device and the drive, wherein the control module receives and stores the vibration values, determines frequency characteristics of the compressor based on the vibration values, and provides the drive input based on the frequency characteristics.

11. The system of claim 10, wherein the control module:
provides a signal to the drive to operate the motor at a minimum frequency;
provides a signal to the drive to increase the motor frequency by a frequency interval; and
receives and stores vibration values from the accelerometer for each frequency interval;
continues increasing until the frequency of the variable speed compressor is at least a maximum compressor frequency; and
calculates a prohibited frequency range based on the vibration values.

12. The system of claim 10, wherein the vibration measurement device is mounted to a shell of the compressor.

13. The system of claim 12, wherein the vibration measurement device is mounted to the drive.

14. The system of claim 10, further comprising a terminal box attached to the compressor.

15. The system of claim 14, wherein the vibration measurement device is mounted to the terminal box.

16. The system of claim 10, wherein the frequency characteristics include a frequency range wherein the vibration values exceed a predetermined threshold.

17. The system of claim 16, wherein the control module provides an input to the drive that prohibits the drive from operating the motor at frequencies including the frequency range wherein the vibration values exceed the predetermined threshold.

18. The system of claim 10, wherein the frequency characteristics include a resonant frequency.

19. The system of claim 18, wherein the control module provides an input to the drive that prohibits the drive from operating the motor at frequencies including the resonant frequency plus or minus a critical frequency difference.

20. The system of claim 19, wherein the critical frequency difference is at least 1 Hz.

* * * * *

UNITED STATES PATENT AND TRADEMARK OFFICE
CERTIFICATE OF CORRECTION

| | | |
|---|---|---|
| PATENT NO. | : 8,849,613 B2 | Page 1 of 1 |
| APPLICATION NO. | : 12/983615 | |
| DATED | : September 30, 2014 | |
| INVENTOR(S) | : Caillat | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 889 days.

Signed and Sealed this
Twenty-second Day of September, 2015

Michelle K. Lee
*Director of the United States Patent and Trademark Office*